(12) United States Patent  
Gupta et al.

(10) Patent No.: US 11,372,724 B2
(45) Date of Patent: Jun. 28, 2022

(54) METHOD AND SYSTEM FOR HANDLING BLOCKCHAIN NETWORK BASED FILE STORAGE SYSTEM

(71) Applicant: Samsung Electronics Co., Ltd., Gyeonggi-do (KR)

(72) Inventors: Vipul Gupta, Noida (IN); Ankur Agrawal, Noida (IN); Rahul Agrawal, Noida (IN); Prashant Sharma, Noida (IN); Kalgesh Singh, Noida (IN); Saurabh Kumar, Noida (IN); Anil Kumar Saini, Noida (IN)

(73) Assignee: Samsung Electronics Co., Ltd

( * ) Notice: Subject to any disclaimer, the term of this patent is extended or adjusted under 35 U.S.C. 154(b) by 361 days.

(21) Appl. No.: 16/787,900

(22) Filed: Feb. 11, 2020

(65) Prior Publication Data

US 2021/0004294 A1 Jan. 7, 2021

(30) Foreign Application Priority Data

Jul. 5, 2019 (IN) ............................. 201941027049

(51) Int. Cl.
*G11C 16/04* (2006.01)
*G06F 11/14* (2006.01)
(Continued)

(52) U.S. Cl.
CPC ...... *G06F 11/1451* (2013.01); *G06F 16/1844* (2019.01); *H04L 9/3236* (2013.01); *H04L 9/3297* (2013.01); *H04L 2209/38* (2013.01)

(58) Field of Classification Search
CPC ............ G06F 11/1451; G06F 16/1844; H04L 9/3236; H04L 9/3297; H04L 2209/38
See application file for complete search history.

(56) References Cited

U.S. PATENT DOCUMENTS 7,627,629 B1 12/2009 Wu et al.
8,447,825 B2 5/2013 Aono
(Continued)

FOREIGN PATENT DOCUMENTS

CN 107943833 4/2018
CN 109299336 2/2019

OTHER PUBLICATIONS

Indian Examination Report dated May 11, 2021 issued in counterpart application No. 201941027049, 6 pages.
(Continued)

*Primary Examiner* — Pho M Luu
(74) *Attorney, Agent, or Firm* — The Farrell Law Firm, P.C.

(57) ABSTRACT

A method and system are provided for handling a blockchain network based file storage system including a plurality of electronic devices. The method of a first electronic device includes generating, by the first electronic device, a first intelligent reflection file system (IRFS) including a reflection of a file system related to the first electronic device and a local block chain related to the first electronic device; storing, by the first electronic device, a first image of a second IRFS related to a second electronic device among the plurality of electronic devices; storing, by the first electronic device, a second image of a third IRFS related to a third electronic device among the plurality of electronic devices; receiving, by the first electronic device, from the second electronic device, a request to store a first data; determining, by the first device, whether or not to validate the request; and in response to determining to validate the request, receiving, by first electronic device, the first data from the second electronic device, storing the first data in the first electronic device, and updating the first IRFS based on the stored first data.

20 Claims, 8 Drawing Sheets

(51) Int. Cl.
*H04L 9/32* (2006.01)
*G06F 16/182* (2019.01)

(56) References Cited

U.S. PATENT DOCUMENTS

| | | | |
|---|---|---|---|
| 11,093,455 B2 * | 8/2021 | Tian | G06F 3/0605 |
| 2009/0228808 A1 | 9/2009 | MacDonald et al. | |
| 2021/0026740 A1 | 1/2021 | Guo et al. | |
| 2021/0182773 A1 * | 6/2021 | Padmanabhan | G06F 21/35 |
| 2021/0326074 A1 * | 10/2021 | Tian | G06F 3/0623 |

OTHER PUBLICATIONS

Ognjanovic, Aleksandar, "Fix: Android phone says 'Storage is full' even after cleaning up", Jan. 16, 2017, https://mobileinternist.com/full-storage-android, pp. 7.

"Introduction to Computer Information Systems/Storage", Sep. 30, 2019, https://en.wikibooks.org/wiki/introduction_to_Computer_Information_Systems/Storage, pp. 17.

* cited by examiner

METHOD AND SYSTEM FOR HANDLING BLOCKCHAIN NETWORK BASED FILE STORAGE SYSTEM

CROSS-REFERENCE TO RELATED APPLICATION(S)

This application claims priority under 35 U.S.C. § 119(a) to Indian Patent Application Serial No. 201941027049, which was filed in the Indian Patent Office on Jul. 5, 2019, the entire content of which is incorporated herein by reference.

BACKGROUND

1. Field

The disclosure relates generally to handling storage devices, and more particularly to a method and system for handling a blockchain network based file storage system.

2. Description of Related Art

Space organization on digital devices is a problem as old as the first data storage. While a user may have a plurality of digital device having their own storage, the plurality of digital devices are conventionally not interactive with each other. For example, the plurality of digital devices are not aware of the data stored in each other's storage unit. Consequently, the user may store the same data in a number of the plurality of digital devices, thereby wasting storage space.

FIG. 1 illustrates a user scenario while conventionally saving and/or backing up data.

Referring to FIG. 1, a user 100 owns a mobile phone, a hard disk, and a laptop.

In scene 1, the user 100 decides to back up the mobile phone's data to the hard disk.

In scene 2, the user 100 finds that few of the files that have to be backed up in the hard disk are already present in the hard disk. Here, the user 100 is not sure about what data is already present in the hard disk.

In scene 3, the user 100 checks his laptop and finds that the data to be backed up is also present in the laptop.

In scene 4, the user 100 is annoyed and confused as to why the same data is backed up at multiple storage units of the multiple electronic devices.

In scene 5, the user 100 finds out that there is no space left for backing up the new data and is unhappy about it.

Thus, as illustrated in the scenario of FIG. 1, neither the user nor the plurality of electronic devices are aware of the same data simultaneously stored at multiple locations. Consequently, a problem of scarcity of storage space and storage space waste occurs.

Accordingly, a need exists for a combined interactive storage system for plurality of electronic devices associated with a user.

SUMMARY

The disclosure is provided to address at least the problems and/or disadvantages described above and to provide at least the advantages described below.

An aspect of the disclosure is to provide a method for a blockchain network based file storage system.

Another aspect of the disclosure is to provide an eco-system including active and/or passive storage devices.

Another aspect of the disclosure is to provide an intelligent reflection file system (IRFS) of a device that can maintain all the transaction (backup, create, write, cut, copy, paste, etc.) within a system (intra-device) using a local blockchain.

Another aspect of the disclosure is to control/validate transactions with other devices of an eco-system (inter-device) using a global blockchain, wherein each block includes a delta of each device's reflection (e.g., an updated portion of a local blockchain).

Another aspect of the disclosure is to provide a method for performing a file transaction after validation.

Another aspect of the disclosure is to provide a method for sharing images of an updated reflection's delta of a file system with a global blockchain.

Another aspect of the disclosure is to provide an IRFS including a local blockchain and a reflection of a file system related to an electronic device.

Another aspect of the disclosure is to provide a method for updating an image of an IRFS related to another electronic device after detecting a file transaction request.

In accordance with an aspect of the disclosure, a method is provided for a first electronic device in a blockchain network based file storage system including a plurality of electronic devices. The method includes generating, by the first electronic device, a first intelligent reflection file system (IRFS) including a reflection of a file system related to the first electronic device and a local block chain related to the first electronic device; storing, by the first electronic device, a first image of a second IRFS related to a second electronic device among the plurality of electronic devices; storing, by the first electronic device, a second image of a third IRFS related to a third electronic device among the plurality of electronic devices; receiving, by the first electronic device, from the second electronic device, a request to store a first data; determining, by the first device, whether or not to validate the request; and in response to determining to validate the request, receiving, by first electronic device, the first data from the second electronic device, storing the first data in the first electronic device, and updating the first IRFS based on the stored first data.

In accordance with another aspect of the disclosure, a first electronic device is provided for use in a blockchain network based file storage system including a plurality of electronic devices. The first electronic device includes a transceiver; a processor; and a memory that stores instructions, which when executed, instruct the processor to generate a first intelligent reflection file system (IRFS) including a reflection of a file system related to the first electronic device and a local block chain related to the first electronic device, store, in the memory, a first image of a second IRFS related to a second electronic device among the plurality of electronic devices, storing, in the memory, a second image of a third IRFS related to a third electronic device among the plurality of electronic devices, receive, via the transceiver, from the second electronic device, a request to store a first data, determine whether or not to validate the request, and in response to determining to validate the request, receive, via the transceiver, the first data from the second electronic device, store the first data in the memory, and update the first IRFS based on the stored first data.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
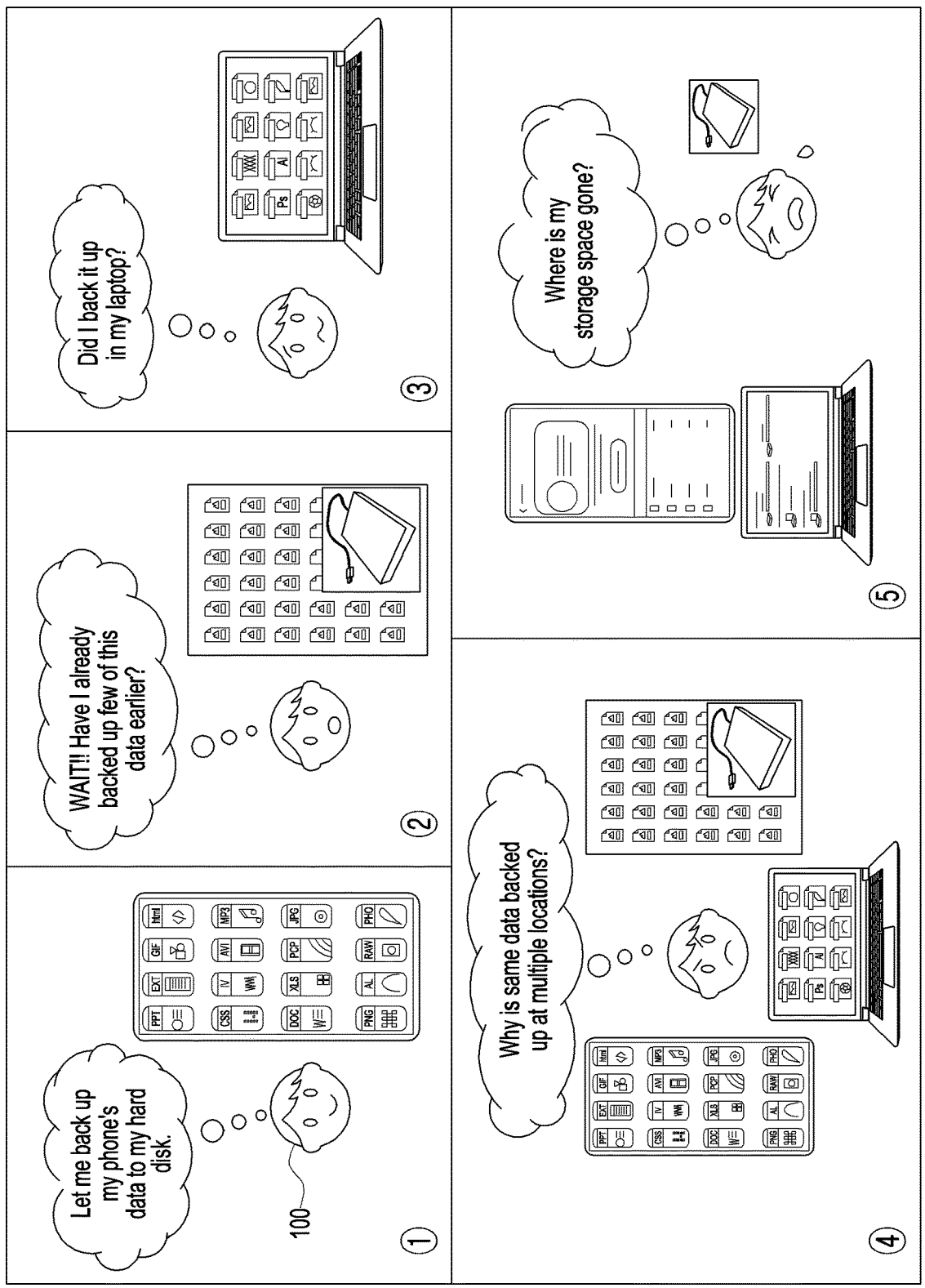
FIG. 1 illustrates a user scenario while conventionally saving and/or backing up data.

Various embodiments of the disclosure will now be described in detail with reference to the accompanying drawings. In the following description, specific details such as detailed configuration and components are merely provided to assist the overall understanding of these embodiments. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

The embodiments described herein are not necessarily mutually exclusive, as some embodiments can be combined with one or more other embodiments to form new embodiments.

The term "or" as used herein, refers to a non-exclusive or, unless otherwise indicated.

As is known to a person of ordinary skill in the art, embodiments may be described and illustrated in terms of blocks which carry out a described function or functions. These blocks, which may be referred to herein as managers, units, modules, hardware components, etc., may be physically implemented by analog and/or digital circuits such as logic gates, integrated circuits, microprocessors, microcontrollers, memory circuits, passive electronic components, active electronic components, optical components, hardwired circuits, etc., and may optionally be driven by firmware and software. The circuits may be embodied in one or more semiconductor chips, or on substrate supports such as printed circuit boards. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc., may be used herein to describe various elements, these elements should not be limited by these terms. These terms are generally only used to distinguish one element from another.

Throughout the drawings, similar reference characters may denote corresponding features.

Herein, a method is provided for blockchain network based file storage system. The method may include detecting, by a first electronic device in the blockchain network, a reflection of a file system of the first electronic device and a local blockchain stored at the first electronic device. The reflection of the file system includes information about files stored in the first electronic device and the local blockchain includes information about events performed on the files stored in the file system. The method further includes creating, by the first electronic device, an intelligent reflection file system (IRFS) comprising the reflection of the file system and the local blockchain. The method also includes storing, by the first electronic device, the IRFS in the file system of the first electronic device.

Figure 2:
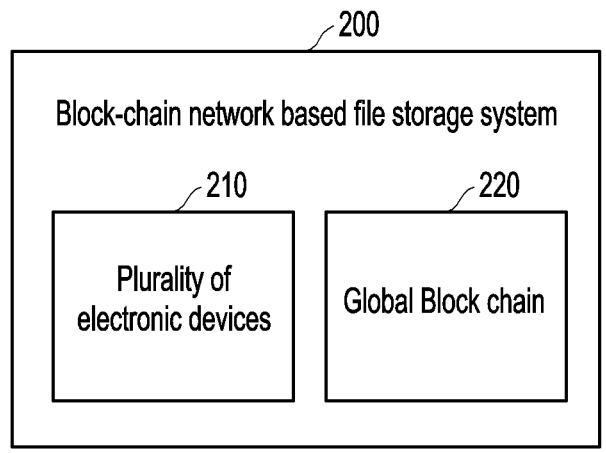
FIG. 2 illustrates a blockchain network based file storage system, according to an embodiment.

FIG. 2 illustrates a blockchain network based file storage system according to an embodiment.

Referring to FIG. 2, the blockchain network based file storage system 200 includes a plurality of electronic devices 210 associated with a user and a global blockchain 220 for handling the data in the plurality of electronic devices 210. The plurality of electronic devices 210 may include a smart social robot, a smart watch, a cellular phone, a smart phone, a personal digital assistant (PDA), a tablet computer, a laptop computer, a music player, a video player, an Internet of things (IoT) device, etc.

The global blockchain 220 and the plurality of electronic devices 210 are communicatively coupled with each other. The global blockchain 220 includes a number of blocks and each block includes changes that have occurred in the IRFS of the plurality of electronic devices 210. The global blockchain 220 may be updated each time there is a transaction between the plurality of electronic devices 210 by adding a block in the global blockchain 220. Thus, the global blockchain 220 tracks all of the transactions happening between the plurality of electronic devices 210. The global blockchain 220 may also ensure that the same data is not stored in plurality of electronic devices 210 without the user's knowledge. Thus, the blockchain network based file storage system 200 is responsible for keeping a track of the data stored in the plurality of electronic devices 210.

Figure 3:
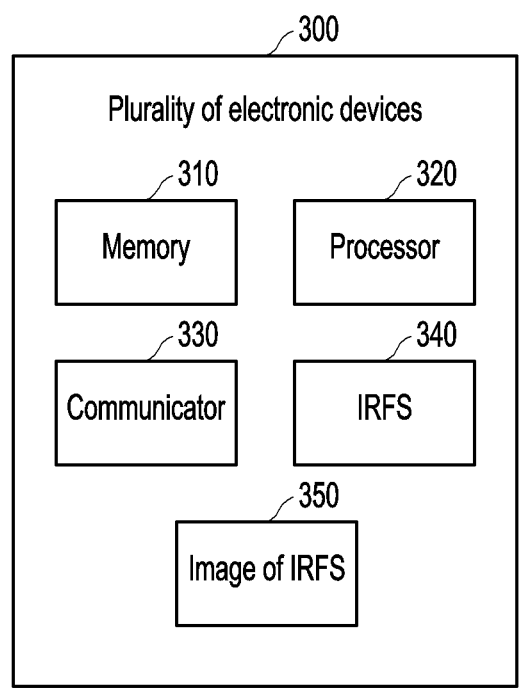
FIG. 3 illustrates an electronic device in a blockchain network based file storage system, according to an embodiment.

FIG. 3 illustrates a plurality of an electronic device in a blockchain network based file storage system according to an embodiment.

Referring to FIG. 3, an electronic device 300, e.g., each of the plurality of electronic devices 210 illustrated in FIG. 2, comprises a memory 310, a processor 320, a communicator 330, an IRFS 340, and images of IRFSs 350 of other electronic devices of the plurality of electronic devices 210. The processor 320 is coupled to the memory 310 and the communicator 330, and is configured to execute instructions stored in the memory 310 and to perform various other processes.

The memory 310 stores instructions to be executed by the processor 310. The memory 310 may include non-volatile storage elements, e.g., magnetic hard discs, optical discs, floppy discs, flash memories, or forms of erasable programmable read only memories (EPROM) or electrically erasable programmable (EEPROM) memories.

In addition, the memory 310 may be considered a non-transitory storage medium. The term "non-transitory" may indicate that the storage medium is not embodied in a carrier wave or a propagated signal. However, the term "non-transitory" should not be interpreted that the memory 310 is non-movable.

The memory 310 can be configured to store large amounts of information. A non-transitory storage medium may store data that can, over time, change (e.g., in random access memory (RAM) or cache).

The communicator 330, e.g., a transceiver, is configured for communicating internally between internal hardware components and with external devices via one or more networks.

The IRFS 340 includes a local blockchain and a reflection of the file system of the electronic device.

Further, the images of IRFSs 350 includes the images of the IRFSs of the other electronic devices of the plurality of electronic devices 210.

The processor 320 is configured to create and store the IRFS 340 in the file system. The processor is further configured to send the IRFS 340 to the plurality of electronic devices 210.

Figure 4:
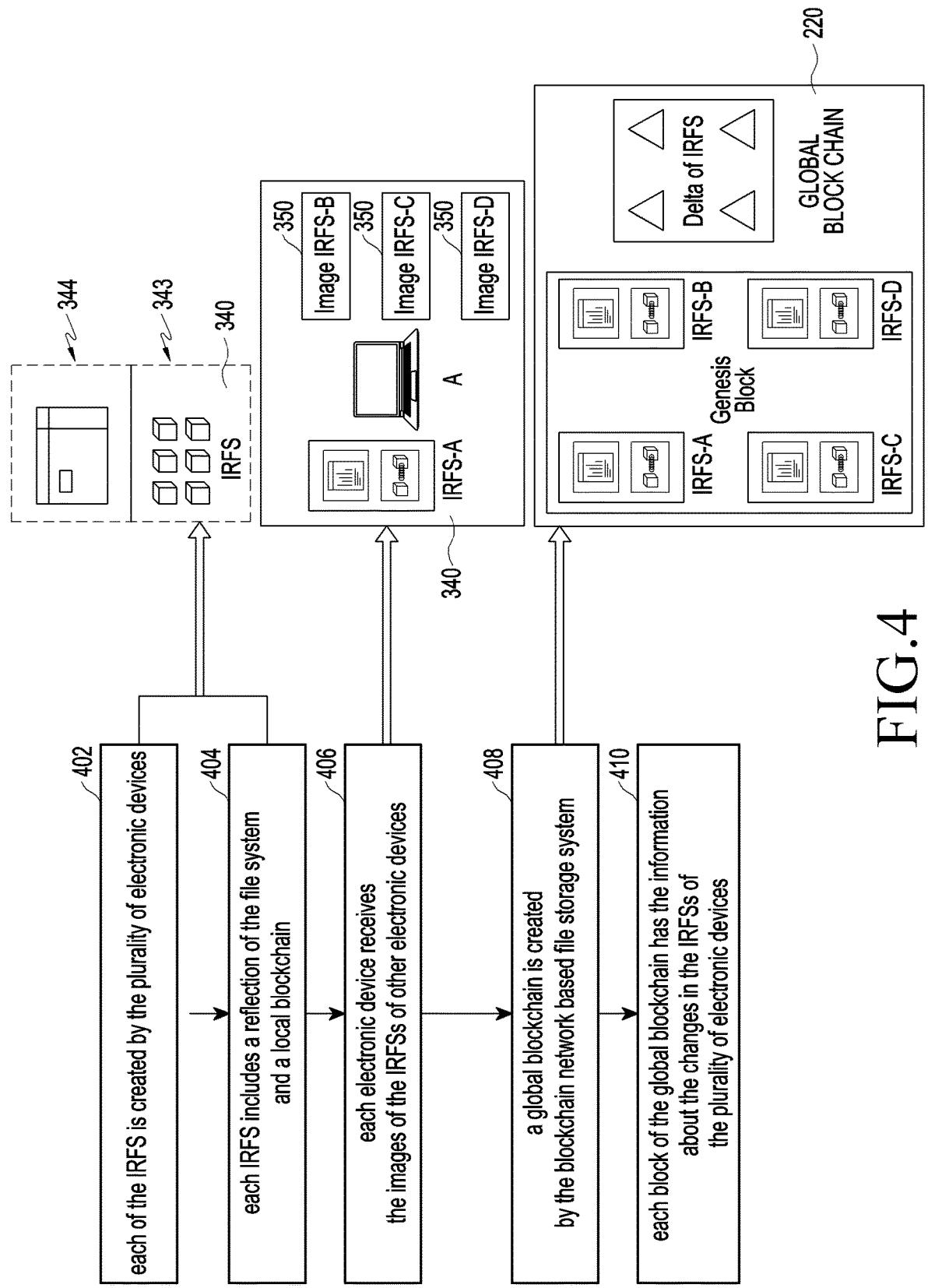
FIG. 4 illustrates a method for handling a blockchain network based file storage system, according to an embodiment.

FIG. 4 illustrates a method for handling a blockchain network based file storage system according to an embodiment.

Referring to FIG. 4, at step 402, each IRFS 340 is created by the plurality of electronic devices 210.

At step 404, each IRFS 340 includes a reflection of the file system 344 and a local blockchain 343.

At step 406, each electronic device receives the images 350 of the IRFSs of other electronic devices. As a result, each of the plurality of electronic devices 210 has its own IFRS 340 as well as the images 350 of the IRFSs of the other electronic devices. In some embodiments, the image of the IRFS may a copy of instance of IRFSs of the other electronic devices which it can use for referencing locally.

At step 408, a global (or master) blockchain 220 is created by the blockchain network based file storage system 200. The global blockchain 220 is responsible for managing the file event transactions between the plurality of electronic devices 210 by using the images 350 of IRFSs in the plurality of electronic devices 210 and sharing any changes in the IRFS 340s of the plurality of electronic devices 210.

At step 410, each block of the global blockchain 220 has the information about the changes in the IRFSs 340 of the plurality of electronic devices 210. For example, a change in the IRFS 340 may occur when a transaction occurs between two of the plurality of electronic devices 210.

Figure 5:
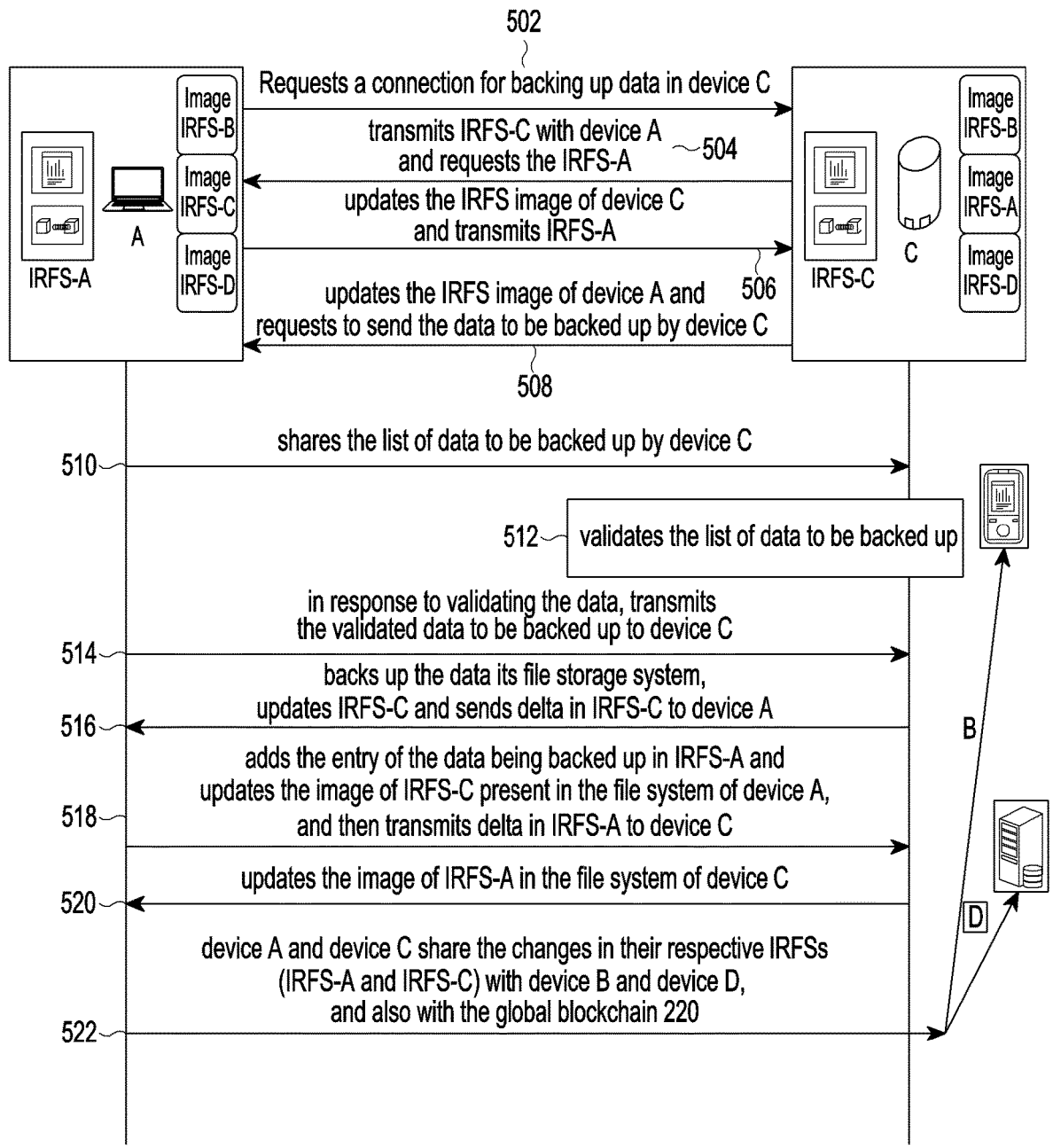
FIG. 5 is a flow diagram illustrating a method according to an embodiment.

FIG. 5 is a flow diagram illustrating a method according to an embodiment.

Referring to FIG. 5, a user has 4 devices (device A, device B, device C, and device D). Device A is a laptop, device B is a hard disk, device C is a mobile phone, and device D is a computer. In accordance with an embodiment, each of devices A, B, C, and D create their own IFRS 340 and store images 350 of the IRFSs of the other devices. For example, device A has its own IRFS-A and also stores images of IRFS-B, IRFS-C, and IFRS-D of devices B, C, and D, respectively.

At step 502, device A requests a connection for backing up data in device C. The data is at least one of image, document, video, or some other file.

At step 504, device C shares its own IRFS (IRFS-C) with device A and requests the IRFS-A from device A. The exchange of IRFSs may occur in series or simultaneously.

At step 506, device A updates the IRFS image of device C in the file system of device A and sends IRFS-A to device C. In some embodiments, the IRFS image of device C may a copy of instance of IRFS of device C, which it can use for referencing locally.

At step 508, device C updates the IRFS image of device A in its own file system and requests device A to send the data to be backed up by device C.

At step 510, device A shares the list of data to be backed up by device C. The data may include at least one new image.

At step 512, device C validates the list of data to be backed up. Device C checks the image of IRFS-A in its own file system to validate whether the data has already been backed up by any other device in the blockchain network based file storage system 200. If device C determines that the data has not been backed up or is not present in any other device, then device C validates the data. However, if device C determines that the data has been backed up or is present in another device, then device C invalidates the data.

At step 514, device A sends the validated data to be backed up to device C, if device C validates the data. The location of data at the device A and the location that the data is saved at the device C is shared between the device A and the device C.

At step 516, device C backs up the data its file storage system and updates its own IRFS (IRFS-C) and sends delta (or Change) in IRFS-C to device A.

At step 518, device A adds the entry of the data being backed up in its own IRFS (IRFS-A) and updates the image of IRFS-C present in the file system of device A, and then sends the change (or delta) in IRFS-A to device C. All the information related to the transaction is added into the local blockchain of IRFS-C and IRFS-A.

At step 520, device C updates the image of IRFS-A in the file system of device C.

At step 522, device A and device C share the changes in their respective IRFSs (IRFS-A and IRFS-C) with device B and device D, and also with the global blockchain 220.

Device B and device D update the images of IRFS-A and IRFS-C in their file systems. Similarly, the global blockchain 220 adds a block indicating the changes in the IRFS-A and IRFS-C, thereby updating the global blockchain 220. As a result, a problem of having the same stored data in multiple devices associated with a user is addressed.

Figure 6:
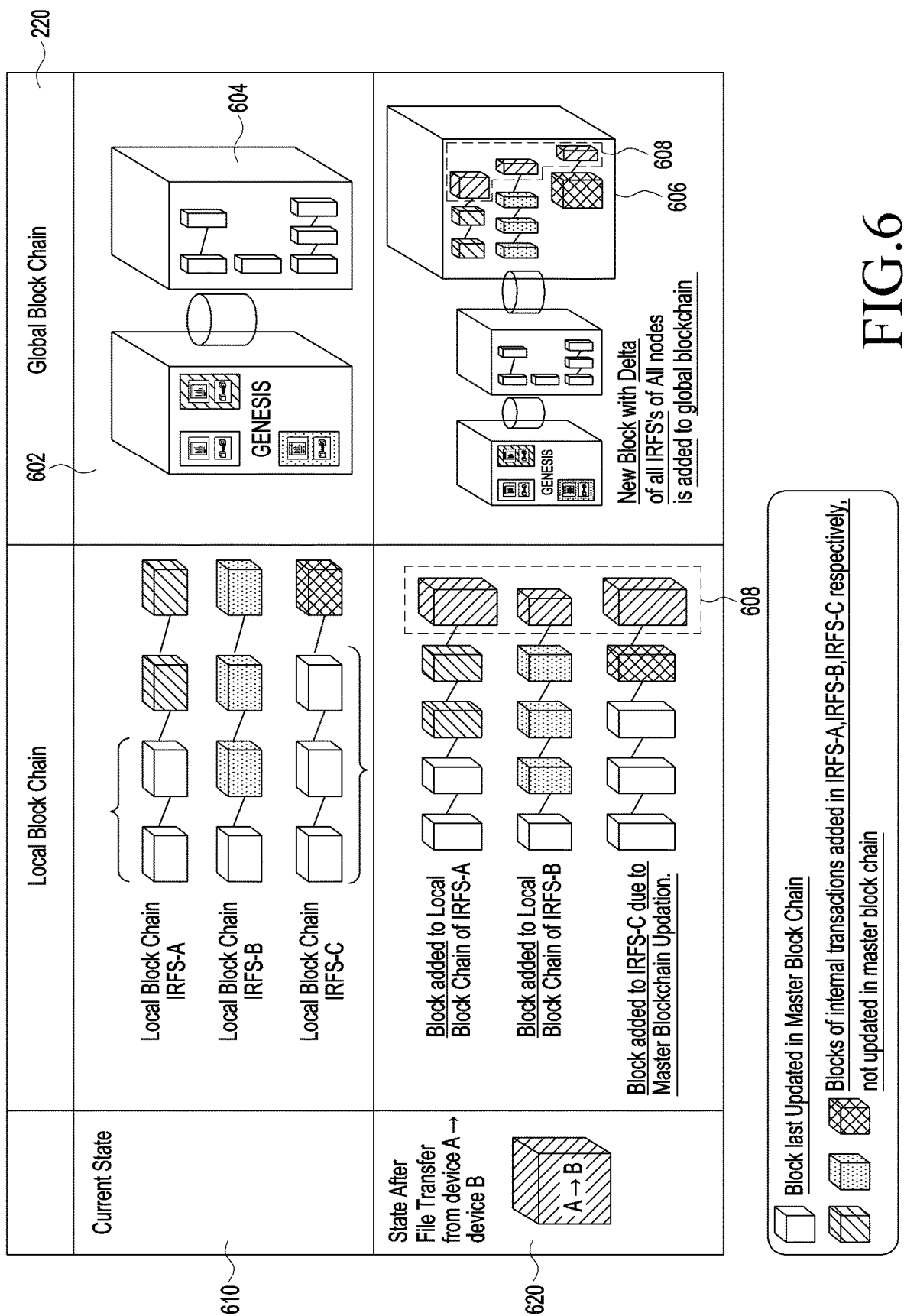
FIG. 6 illustrates an update of a global blockchain after a file transaction between a plurality of electronic devices, according to an embodiment.

FIG. 6 illustrates an update of a global blockchain after a file transaction between a plurality of electronic devices according to an embodiment.

More specifically, FIG. 6 illustrates a current state 610 of a global (or master) blockchain 220 and a current state of the IRFS-A, IRFS-B, and IRFS-C, and a changed state 620 of the global blockchain 220 and the IRFS-A, IRFS-B and IRFS-C, after a file is transferred from device A to device B.

The global blockchain 220 in the current state includes the IRFS of device A, B, and C in block 602, wherein block 604 indicates blocks present in the global blockchain 220.

After a file is transferred from device A to device B, Since a file transaction has occurred between devices A and B, there is a new block 608 in the IRFS-A, the IRFS-B and the IRFS-C.

Further, a new block 606 is added in the global blockchain 220. The new block 606 with delta of the IRFS-A, the IRFS-B and the IRFS-C is added to the global blockchain 220.

Figure 7:
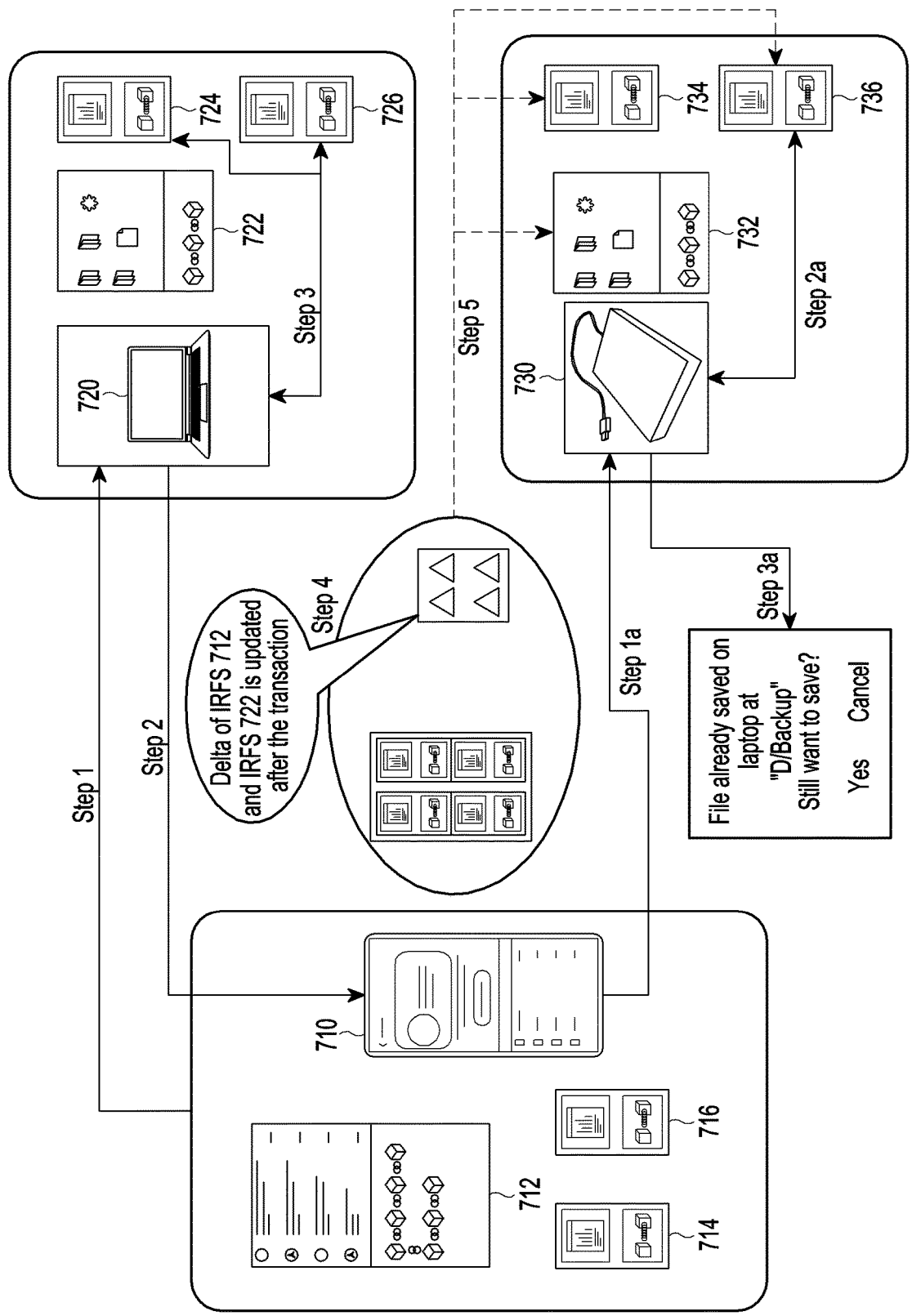
FIG. 7 illustrates examples of a valid transaction and an invalid transaction, according to an embodiment.

FIG. 7 illustrates examples of a valid transaction and an invalid transaction, according to an embodiment.

Referring to FIG. 7, a file system of a mobile phone 710 of a user includes an IRFS 712 of the mobile file system, an image of IRFS 714 of a laptop 720 of the user, and an image of IRFS 716 of a hard disk 730 associated with the user.

Similarly, a file system of the laptop 720 includes an IRFS 722 of the laptop file system, an image of IRFS 724 of the mobile 710 and image of IRFS 726 of the hard disk 730, and a file system of the hard disk 730 includes an IRFS 732 of the hard disk file system, an image of IRFS 734 of the mobile 710, and an image of IRFS 736 of the laptop 730.

In a valid transaction, at step 1, the mobile phone 710 requests a transfer of a group of files from the laptop 720.

At step 2, the laptop 720 validates the group of files for which transfer is requested. More specifically, the laptop 720 determines whether the group of files has been backed up in any other device by checking the image of IRFS 726 of the hard disk 730 and the image of the IRFS 724 of mobile phone 710 and validates the group of files based on the determination.

At step 3, the mobile phone 710, receives the requested files, after validation, and updates the transaction in the IRFS 712 of the mobile phone 710 and the IRFS 722 of the laptop 720.

At step 4, the change (or delta) of the IRFS 712 and IRFS 722 is updated in the global blockchain by adding a block.

At step 5, the change in the IRFS 712 and IRFS 722 is updated in the image of the IRFS 734 of the mobile phone 710 and the image of the IRFS 736 of the laptop 720 in the file system of the hard disk 730.

In an invalid transaction, at step 1a, the mobile phone 710 requests a transfer of a group of files from the hard disk 730.

At step 2a, the hard disk 730 attempts to validate the group of files for which transfer is requested. More specifically, the hard disk 730 checks whether the group of files has been backed up in any other device by checking the image of IRFS 734 of the mobile phone 710 and the image of the IRFS 736 of laptop 720 in the file system of the hard disk 730.

At step 3a, the hard disk 730 determines that the group of files is already saved in the laptop 720. Thus, the data transaction is invalidated.

At this point, the user may be asked whether to proceed with transferring of the group of files or not by indicating to the user that the files are already present in the laptop 720. Thus, the proposed method informs the user that the same data is already saved at one of the plurality of electronic devices associates the user and may prevent the user form saving the same data again, thereby, saving the storage space available in the user's device and informing the user about the stored data.

Figure 8:
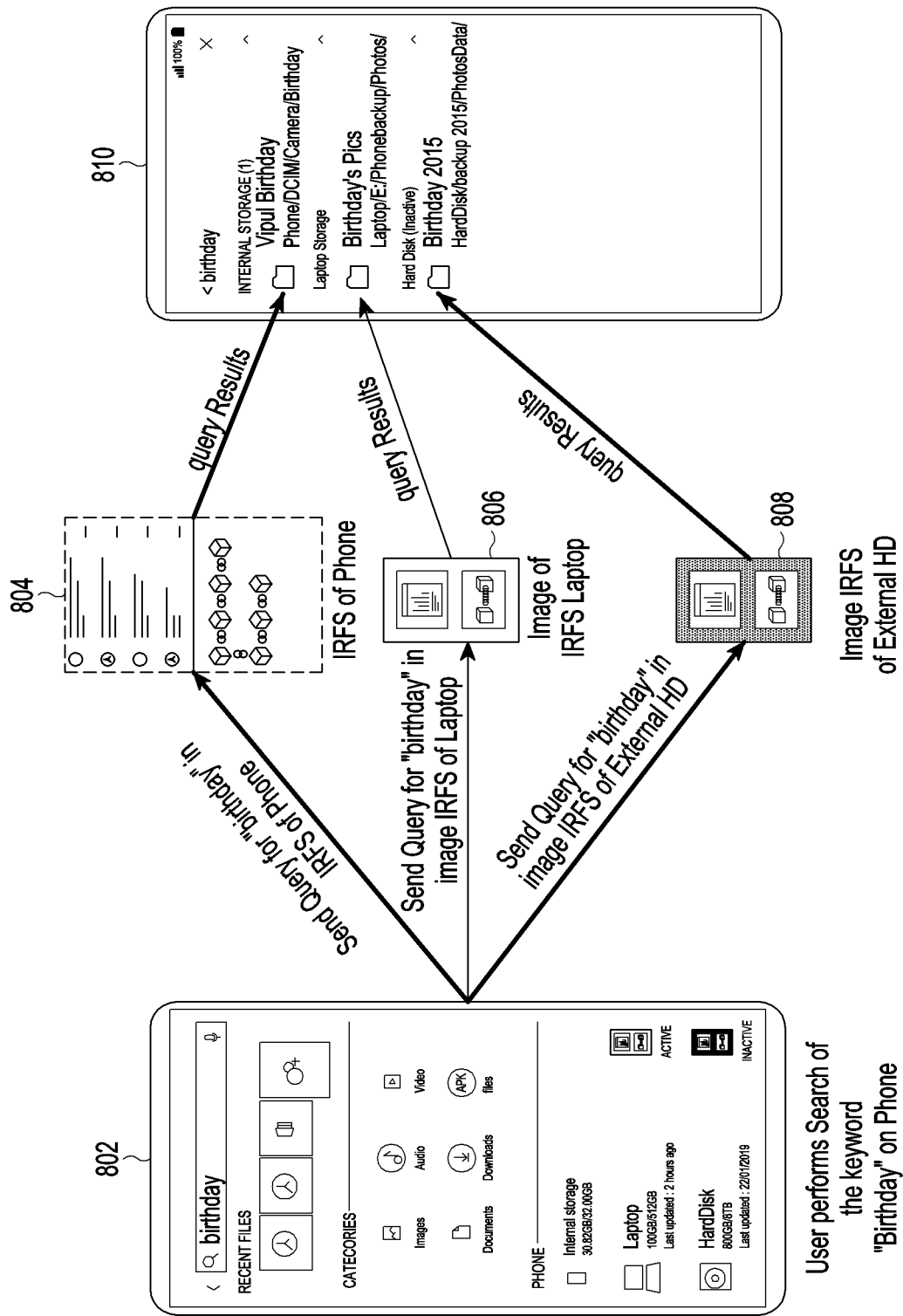
FIG. 8 illustrates an example of a search performed by a user in a blockchain based network file storage system, according to an embodiment.

FIG. 8 illustrates an example of a search performed by a user in a blockchain based network file storage system according to an embodiment.

Referring to FIG. 8, a user may perform a search in a blockchain based network file storage system for a file system of a plurality of electronic devices associated with the user. The file system may also be referred to as storage nodes in the blockchain based network file storage system. The blockchain based network file storage system allows the user to perform a search for a file in all of the storage nodes by inputting a search query in any of the plurality of electronic devices associated with the user.

In FIG. 8, in screen 802 the user inputs the search query "Birthday" in a mobile phone. The blockchain based network file storage system sends the query in an IRFS of the mobile phone, and images of IRFSs of the other electronic devices associated with the user.

In FIG. 8, the blockchain based network file storage system sends the query in the IRFS 804 of the mobile phone, in an image of IRFS 806 of a laptop and an image of IRFS 808 of an external hard disk.

Screen 810 illustrates the search result provided to the mobile phone by the blockchain based network file storage system.

If the user inputs the search query "Birthday" in another electronic device, e.g., the laptop, the result will be same as shown in screen 810. Thus, the method of FIG. 8 provides information about data present in the plurality of electronic devices by performing a search query in any electronic device.

Figure 9:
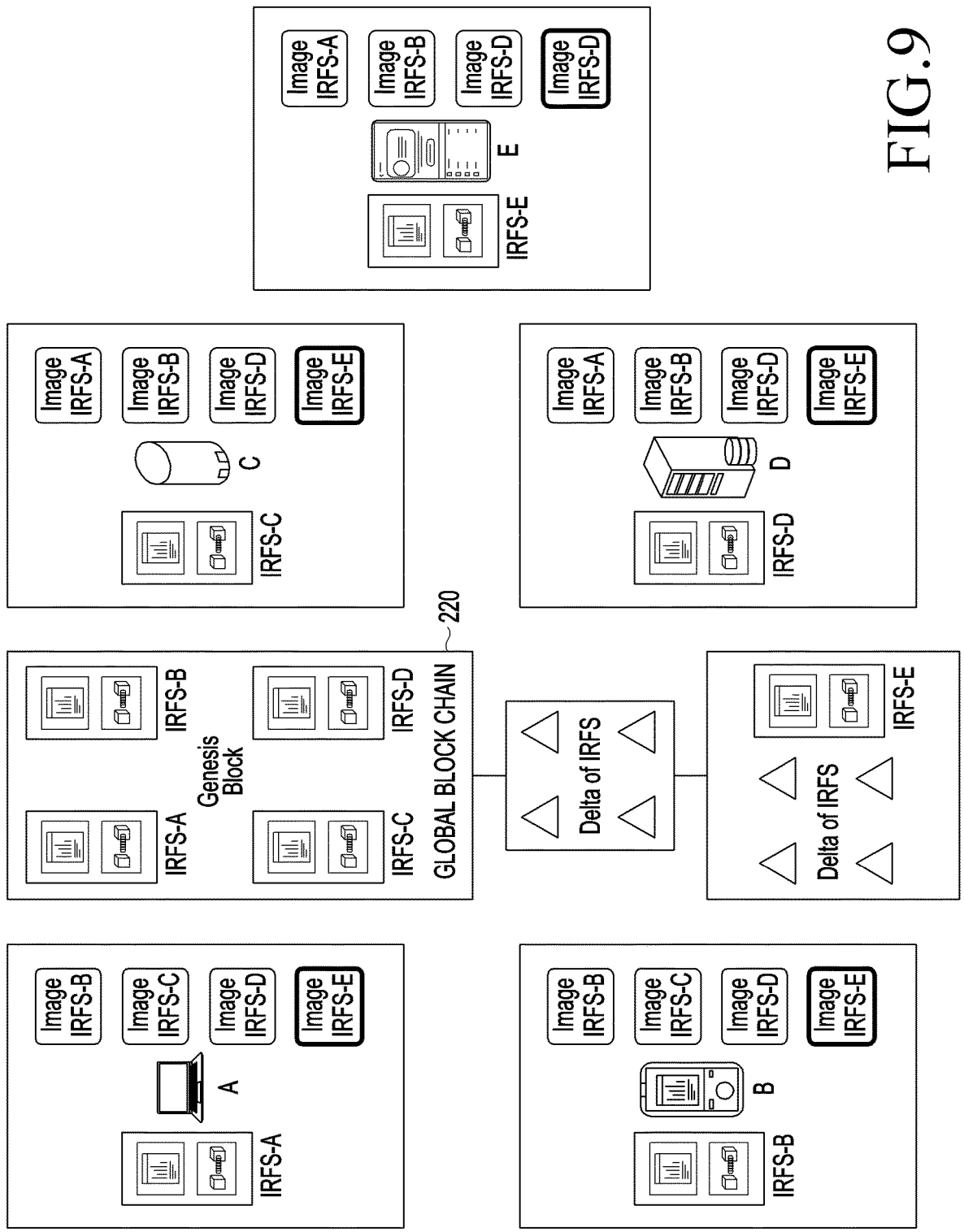
FIG. 9 illustrates an addition of a new storage node in a blockchain network based file storage system, according to an embodiment.

FIG. 9 illustrates an addition of a new storage node in a blockchain network based file storage system, according to an embodiment.

Referring to FIG. 9, a blockchain network based file storage system includes four storage nodes (devices A, B, C, and D) associated with a user. A global blockchain 220 includes IRFSs of devices A, B, C, and D, respectively.

When a new device E associated with the user is added in the blockchain network based file storage system, device E creates its own IRFS-E including a reflection of the file system of the device E and a local blockchain. Device E receives and stores the images of the IRFSs from devices A-D.

Device E also shares an image of IRFS-E with devices A-D, which store the received image of IRFS-E in their file systems.

The global blockchain 220 initially includes the IRFSs of device A-D. However, after the addition of device E to the system, the image of the IRFS-E is also added in the global blockchain 220 by adding a new block. Thus, the method of FIG. 9 provides scalability by including any new storage node that is added in the blockchain network based file storage system.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

Therefore, while certain embodiments have been described herein, it will be understood by those of ordinary skill in the art that various changes in form and details may be made therein without departing from the spirit and scope of the disclosure as defined by the following claims and their equivalents.

What is claimed is:

1. A method of a first electronic device in a blockchain network based file storage system including a plurality of electronic devices, the method comprising:
generating, by the first electronic device, a first intelligent reflection file system (IRFS) including a reflection of a file system related to the first electronic device and a local blockchain related to the first electronic device;
storing, by the first electronic device, a first image of a second IRFS related to a second electronic device among the plurality of electronic devices;
storing, by the first electronic device, a second image of a third IRFS related to a third electronic device among the plurality of electronic devices;
receiving, by the first electronic device, from the second electronic device, a request to store a first data;
determining, by the first electronic device, whether or not to validate the request; and
in response to determining to validate the request, receiving, by first electronic device, the first data from the second electronic device, storing the first data in the first electronic device, and updating the first IRFS based on the stored first data.

2. The method of claim 1, further comprising transmitting, by the first electronic device, a third image of the first IRFS to at least one of the second electronic device and the third electronic device.

3. The method of claim 1, further comprising transmitting, by the first electronic device, a third image of the first IRFS to a global blockchain.

4. The method of claim 1, wherein the second IRFS related to the second electronic device includes a second reflection of a file system related to the second electronic device and a second local block chain related to the second electronic device, and
wherein the third IRFS related to the third electronic device includes a third reflection of a file system related to the third electronic device and a third local block chain related to the third electronic device.

5. The method of claim 1, further comprising transmitting, by the first electronic device, a third image of the updated first IRFS to at least one of the second electronic device and the third electronic device.

6. The method of claim 1, further comprising transmitting, by the first electronic device, a third image of the updated first IRFS to a global blockchain.

7. The method of claim 1, wherein determining whether or not to validate the request comprises:
determining whether or not the first data is already stored in at least one of the plurality of electronic devices; and
determining to validate the request, in response to determining that the first data is not already stored in at least one of the plurality of electronic devices.

8. The method of claim 7, further comprising determining to not validate the request, in response to determining that the first data is already stored in at least one of the plurality of electronic devices.

9. The method of claim 7, wherein determining whether or not the first data is already stored in at least one of the plurality of electronic devices comprises:
checking the first IRFS related to the first electronic device for the first data;
checking the second image of the third IRFS related to the third electronic device for the first data; and
determining that the first data is already stored in at least one of the plurality of electronic devices, in response to identifying the first data in the checked first IRFS related to the first electronic device or the second image of the third IRFS related to the third electronic device.

10. The method of claim 1, further comprising updating, by first electronic device, the first image of the second IRFS related to the second electronic device, based on the storing of the first data from the second electronic device.

11. A first electronic device in a blockchain network based file storage system including a plurality of electronic devices, the first electronic device comprising:
a transceiver;
a processor; and
a memory that stores instructions, which when executed, cause the processor to:
generate a first intelligent reflection file system (IRFS) including a reflection of a file system related to the first electronic device and a local block chain related to the first electronic device,
store, in the memory, a first image of a second IRFS related to a second electronic device among the plurality of electronic devices,
storing, in the memory, a second image of a third IRFS related to a third electronic device among the plurality of electronic devices,
receive, via the transceiver, from the second electronic device, a request to store a first data,
determine whether or not to validate the request, and
in response to determining to validate the request, receive, via the transceiver, the first data from the second electronic device, store the first data in the memory, and update the first IRFS based on the stored first data.

12. The first electronic device of claim 11, wherein the instructions, when executed, further cause the processor to transmit, via the transceiver, a third image of the first IRFS to at least one of the second electronic device and the third electronic device.

13. The first electronic device of claim 11, wherein the instructions, when executed, further cause the processor to transmit, via the transceiver, a third image of the first IRFS to a global blockchain.

14. The first electronic device of claim 11, wherein the second IRFS related to the second electronic device includes a second reflection of a file system related to the second electronic device and a second local block chain related to the second electronic device, and
wherein the third IRFS related to the third electronic device includes a third reflection of a file system related to the third electronic device and a third local block chain related to the third electronic device.

15. The first electronic device of claim 11, wherein the instructions, when executed, further cause the processor to transmit, via the transceiver, a third image of the updated first IRFS to at least one of the second electronic device and the third electronic device.

16. The first electronic device of claim 11, wherein the instructions, when executed, further cause the processor to transmit, via the transceiver, a third image of the updated first IRFS to a global blockchain.

17. The first electronic device of claim 11, wherein the instructions, when executed, further cause the processor to:
determine whether or not the first data is already stored in at least one of the plurality of electronic devices, and
determine to validate the request, in response to determining that the first data is not already stored in at least one of the plurality of electronic devices.

18. The first electronic device of claim 17, wherein the instructions, when executed, further cause the processor to determine to not validate the request, in response to determining that the first data is already stored in at least one of the plurality of electronic devices.

19. The first electronic device of claim 17, wherein the instructions, when executed, further cause the processor to:
check the first IRFS related to the first electronic device for the first data,
check the second image of the third IRFS related to the third electronic device for the first data, and
determine that the first data is already stored in at least one of the plurality of electronic devices, in response to identifying the first data in the checked first IRFS related to the first electronic device or the second image of the third IRFS related to the third electronic device.

20. The first electronic device of claim 11, wherein the instructions, when executed, further cause the processor to update the first image of the second IRFS related to the second electronic device, based on storing the first data from the second electronic device.

\* \* \* \* \*